Nov. 29, 1927.   
G. W. VEALE  
1,651,006
BUMPER
Filed March 16, 1927
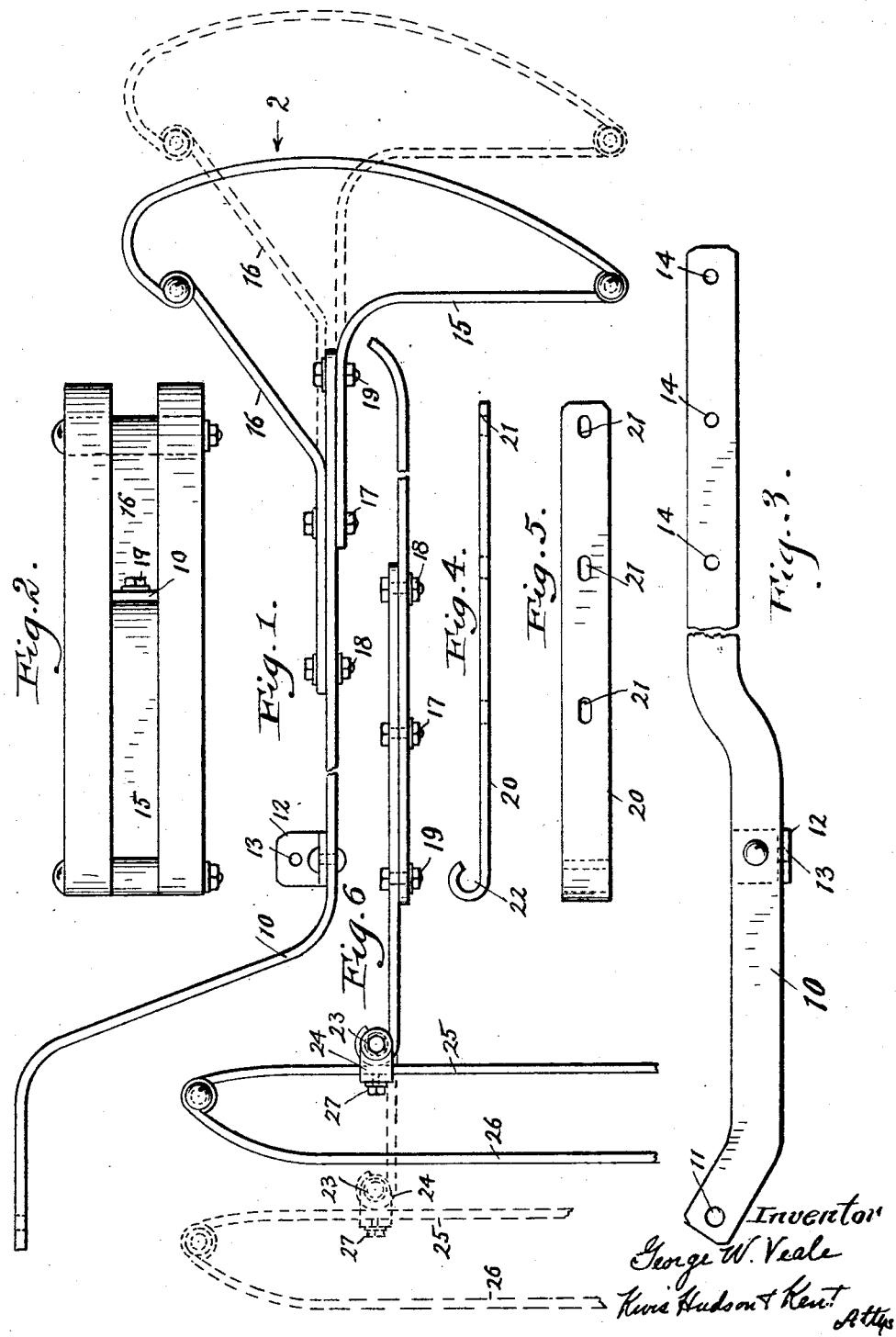

Patented Nov. 29, 1927.

1,651,006

UNITED STATES PATENT OFFICE.

GEORGE W. VEALE, OF CLEVELAND HEIGHTS, OHIO, ASSIGNOR TO THE EATON AXLE & SPRING COMPANY, OF CLEVELAND, OHIO, A CORPORATION OF OHIO.

BUMPER.

Application filed March 16, 1927. Serial No. 175,670.

This invention relates to supports for fender guards and bumpers, and more particularly to a support of this character which is constructed and adapted to carry either a fender guard or one end of a full bumper, means for adjustment being included in either case.

In the manufacture and marketing of automobile bumpers and fender guards, it is, of course, highly desirable to keep at a minimum the number of brackets, supporting bars, fastenings, etc., necessary for the application of the bumpers or fender guards to various makes and models of automobiles. The present invention has to do with the accomplishment of this purpose in the case of automobiles in which certain body types extend further to the rear of the chassis than certain other body types.

An object of the invention is to provide a support for the rear of an automobile which is adapted to carry either one fender guard or one end of a full bumper.

Another object is to provide for adjustment longitudinally of the support in order to make it possible to apply either the fender guards or the bumper to automobiles having either of the two body types above mentioned.

Other objects will appear as I proceed with the description of that embodiment of the invention which, for the purposes of the present application, I have illustrated in the accompanying drawing, in which:

Fig. 1 is a plan view of a supporting bar with a fender guard carried thereby, the latter being shown in two different positions of adjustment;

Fig. 2 is a rear end view of the fender guard, that is, a view looking in the direction of arrow 2 in Fig. 1;

Fig. 3 is a side elevation of the supporting bar;

Fig. 4 is a plan view of an extension for the supporting bar;

Fig. 5 is a side elevation of the same; and

Fig. 6 is a plan view of a portion of the supporting bar with the extension in place thereon and showing one end of a bumper supported thereon in two different positions of adjustment.

In the drawing, the supporting bar 10 is illustrated in a form which I have found suitable for Ford automobiles, a hole 11 being provided as a means for attachment of the bar by a bolt or the like to the chassis frame, and an angle plate 12 riveted to the bar being provided for attachment to the body of the car, a hole 13 in the plate being employed for the reception of suitable fastening means.

The modification of the bar in form and dimensions in order to accommodate it to other makes of automobiles is, of course, within the purview of the invention.

Along the outer or rear end of the supporting bar I form a series of holes 14, preferably three in number, adapted for the reception of fastenings, such as bolts, by means of which the supporting arms 15 and 16 of a fender guard may be mounted. As shown in Fig. 1, the bolt 17 extends through a hole 14 in the supporting bar and also through registering holes in both of the arms 15 and 16, while bolts 18 and 19 respectively extend through the supporting bar and the arm 16 in the one case and through the supporting bar and the arm 15 in the other case. When the fender guard is adjusted further to the rear, as shown in dotted lines, the arm 15 is held by one bolt only extending through the rearmost hole 14 of the supporting bar and also through a hole in the arm 16, the arm 16 being then held by the two bolts 17 and 19 instead of the two bolts 17 and 18 as before. The forward of the two positions illustrated may be employed, for instance, upon automobiles having coupe or roadster bodies, while the rear position is used for sedan or touring car bodies.

Now, when the customer desires a full bumper instead of a pair of fender guards, I utilize the same supporting bars 10 but attach to them an extension 20 provided with a series of slightly elongated holes 21, preferably three in number, spaced like the holes 14. This extension I attach to the supporting bar 10 by means of three bolts 17, 18 and 19, that is, for coupes and roadsters. For sedans and touring cars, however, the extension is moved rearwardly, as indicated in dotted lines in Fig. 6, and then the two bolts 17 and 19 only are employed. The rear extremity of the extension 20 is rolled into an open eye 22 which is adapted to receive a bolt 23 by means of which a U-shaped clip 24 is supported. This clip surrounds an attaching bar 25 of a full length bumper 26 and the parts may be securely held together by a set screw 27 or by other suitable means.

A dealer or garage man stocking these bumpers and fender guards requires a pair of supporting bars 10 for each bumper or pair of fender guards, regardless of the body type upon which they are to be used, and in addition needs only a pair of extensions 20 for each bumper in stock instead of requiring special supporting bars for the latter. The saving in manufacturing costs is therefore considerable.

Having thus described my invention, I claim:

1. In combination, a pair of supporting bars extending rearwardly from the opposite sides of an automobile chassis, said bars being adapted to carry a pair of fender guards in either of two positions of adjustment longitudinally of the vehicle, and a pair of extensions for said supporting bars adapted to be secured to the latter in either of two positions longitudinally of the vehicle, said extensions being adapted to carry a bumper, whereby a single pair of supporting bars may be employed to carry either fender guards or a bumper for use with either of two bodies extending different distances rearwardly of the chassis.

2. In combination, a pair of supporting bars extending rearwardly from the opposite sides of an automobile chassis, said bars having a plurality of holes therein spaced lengthwise thereof, said bars being adapted to carry a pair of fender guards in either of two positions of adjustment longitudinally of the bars by means of fastenings cooperating with said holes, and a pair of extensions for said supporting bars adapted to be secured to the latter in either of two positions of adjustment longitudinally of the vehicle by means of fastenings cooperating with said holes, said extensions being adapted to carry a bumper, whereby a single pair of supporting bars may be employed to carry either fender guards or a bumper for use with either of two bodies extending different distances rearwardly of the chassis.

3. In combination, a support for a fender guard, and an extension for said support having means thereon for carrying one end of a full bumper.

4. In combination, a support for a fender guard, and an extension for said support adapted to be secured thereto in a plurality of positions of adjustment longitudinally of the support, said extension having means thereon for carrying one end of a full bumper.

In testimony whereof, I hereunto affix my signature.

GEORGE W. VEALE.